Sept. 28, 1943.   S. LONGMAN ET AL   2,330,502
PLASTIC PACKING
Filed Oct. 3, 1941

STANLEY LONGMAN AND
CHARLES L. FARR
INVENTORS

BY
Their ATTORNEYS

Patented Sept. 28, 1943

2,330,502

UNITED STATES PATENT OFFICE 2,330,502

PLASTIC PACKING

Stanley Longman, Red Bank, and Charles L. Farr, Cranford, N. J.

Application October 3, 1941, Serial No. 413,396

7 Claims. (Cl. 288—8)

The present invention relates to an improved packing for stuffing boxes to prevent leakage of fluids of all kinds, such as air, water, steam, gas, oil and the like.

At the present time there is a particular demand for plastic packings for use in stuffing boxes which house piston rods, cables and the like. This is particularly true with regard to stuffing boxes for cables employed in ships and vessels of all kinds. The packings for stuffing boxes for cables in vessels and particularly electric cables must stand the most rigorous tests, as regards pressures and temperatures. One of the usual tests employed for this purpose is to install the complete assembly of a cable section and packing in the stuffing box and to draw the gland nuts snug with a suitable wrench. There is then applied an air pressure of 25 lbs. per square inch, and any leakage that occurs from the stuffing box is measured by the number of bubbles that appear per second in an outer cold water trough surrounding the test apparatus. With the air pressure still applied, the water is drained from the outer trough and the air within the compartments of the apparatus tested is heated to 212° F. by means of a water bath. These conditions are maintained for one hour and any leakage occurring is measured. The apparatus is then allowed to cool off and when cold, the leakage from the stuffing tubes is again measured. These conditions are repeated at least three times.

It will be evident from this test that certain criteria of the suitability of a packing for stuffing boxes housing electric cables are the facility with which the packing makes a tight seal upon the application of pressure, and the extent to which the packing will resist the elimination of volatiles at highly elevated temperatures. Moreover, many of the cables which are employed are covered with a woven metallic braid. It is essential when such cables are used that the packing have sufficient plasticity to flow into the interstices of the braid to insure the proper seal.

The cables that pass through these stuffing boxes are also prone to some movement due to the vibration to which these cables are subjected and thus the packing must have enough resilience and flow to be able to seal so that the joint will remain tight under these conditions.

It is an object of this invention to furnish a packing for stuffing boxes which, though it can be deformed and compressed to give a tight seal under static conditions, will still have enough resilience to make a tight seal under dynamic conditions such as would be encountered during the movement of the cables due to vibration and similar conditions which arise during service without becoming permanently deformed and leaky under the fluid pressures acting thereon.

Packings, plastic in nature, and said to be suitable for the purpose in view have been described in the prior art. These packings usually consist of fillers such as granulated cork, graphite, and as a binder, a high melting point grease. While for many purposes this composition is suitable, it does not meet the rigorous tests demanded of cable packings to the ultimate degree, for the reason that there is a considerable loss of materials at the highly elevated temperatures to which the packings are subjected during test and during actual service. They also have the disadvantage that they do not always effect the desired seal in a minimum of time and they do not have the high resilience required to give a tight seal during the movement of cables such as is encountered during actual service.

We have now discovered a packing composition which is an improvement over that described in the prior art in that it is much more resistant to elevated temperatures, is capable of forming a tight seal in the minimum of time, and is not prone to lose these properties due to oxidation or breaking down of the binder such as might be encountered when the binder is a high melting point grease or tallow such as has been described in prior art.

It is, therefore, an object of our invention to provide a plastic packing, particularly suitable for sealing cables and the like in stuffing boxes in the minimum of time, which has superior elasticity and plasticity and which, when subjected to temperatures of the order of boiling water or higher, loses but very little of the constituents thereof.

Our packing possessing the desired properties comprises in its essence a resilient filler such as shredded or granulated cork, a foliated material, which acts as an assistant to flow and as a lubricant such as graphite, mica, metallic powders, foliated glass, or expanded vermiculite, and as the predominant and most essential ingredient a plastic polymer of isobutylene which is flowable under pressure. There is also advantageously present a plasticizer for such isobutylene polymer, such as a metallic soap base grease, paraffin wax, high boiling mineral oil, petrolatum or the like. The polymer of isobutylene which preponderates in the composition acts as a binder for the other ingredients. Plastic polymers of isobutylene are employed which are flowable under elevated pressures, and we have found that, for the purpose in question, polymers having an average molecular weight of from about 10,000 to about 16,400 are most suitable. Such polymers may be made as such according to the usual methods, as for instance, those described in the U. S. Patent No. 2,130,507 and others, or may be made by blending a high molecular weight polymer of the order of, for instance, 50,000 with a low molecular weight polymer of, for instance, the order of 3000. For instance, in the following Example 2, 100 parts of polyisobutylene having a molecular weight of 50,000 are blended with 250 parts of polyisobutylene having a molecular weight of 3,000 to produce a polymer having an average molecular weight of about 16,400.

The particular properties which are possessed by our packing and to which its advantages are due, are attributable in the main to the presence of the polyisobutylene. Polyisobutylene of a molecular weight between 10,000 and 16,400 is not affected by temperatures up to 250° F., and hence does not decompose and give off volatiles at temperatures to which the packing is subject during use. Furthermore, since the polymer is practically completely saturated, it does not tend to take up oxygen and thereby lose its original plasticity or flowability. A further important factor is that the polyisobutylene has very little tendency to lose its tackiness and thereby its binding and sealing properties. Moreover, compositions containing polymers of isobutylene within the weight limits stated, while deformable under very high pressures for insertion into the stuffing box, retain a sufficiently high resiliency to resist a subsequent permanent deformation under the fluid pressures encountered in service thus causing the packings to remain tight under all circumstances.

These isobutylene polymers also have remarkable chemical resistance and, therefore, in the packing composition they have the added advantage of being resistant to gases such as are used in warfare. They are also highly resistant to water and steam and are not prone to hydrolize, decompose or give off volatile matter when in contact with water or steam.

Finally, as will be seen from U. S. Patent No. 2,041,835, packing compositions are normally produced or formed while utilizing a volatile solvent. The difficulties inherent in the complete removal of such a solvent are self-evident. With our compositions, employing polyisobutylene as a binder, there is no need to use any volatile solvent, since the polyisobutylene readily wets the filler such as the ground or granulated cork and the other fillers referred to above. As a consequence, a further possible source of loss through volatilization of solvents is avoided.

In manufacturing our packings, it is the usual practice to form the packings in the desired shape surrounded by a loosely woven cotton jacket or similar fabric. This can be accomplished through the use of an extruder and braider, such as is found in the factories which practice this art. The drawing appended hereto, to which reference will be subsequently made, illustrates packings of this type. It has been stated previously that one of the particular advantages of our packing is its ability to effect an instantaneous seal. This result is best accomplished by coating the finished coil with a thin layer of a grease, such as will be described hereinafter.

It is preferred to apply the grease coating to the packing formed by extrusion before weaving on the jacket as this makes a packing that can be easily wound on to rolls and will not cause a sticking condition that might make it difficult to unroll easily. Although this is the preferred embodiment, it is obvious that the grease coating could also be applied on the outside of the braided jacket where stickiness and ease of handling is not of importance.

It has been found that a packing thus prepared is more adhesive and on the application of pressure to the packing by turning up the gland nuts will give an immediate seal that will withstand the tests mentioned previously. It is not essential that the packing have this grease coating to effect immediate seal, but we have found that it is preferred in that the packing has increased adhesion to the metal walls of the stuffing box and to the steel braid covered cables which are frequently used on vessels.

It is believed that the superior results obtained with the grease coated packing are due to the fact that the grease has a softening action on the polyisobutylene polymer binder of the packing and gives a highly tacky surface which lies between the packing proper and the grease coating. This coating is disturbed when pressure is applied and gives an immediate adhesion and seal until the packing proper has had an opportunity to conform with the irregularities of the stuffing box wall and the cables going through the stuffing box.

Our invention is further illustrated by the examples which will follow and especially when taken with the accompanying drawing, in which Fig. 1 is an elevation of a short length of packing;

Figure 1:
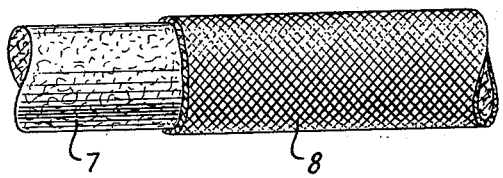
Figure 2:
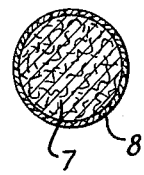
Fig. 2 is an end view thereof.

The packing in the form shown in Figures 1 and 2 consists essentially of granulated or shredded cork, a foliated material such as graphite or mica, a plastic polymer of polyisobutylene and a plasticizer for said polymer. These ingredients 7 are extruded and then covered with a braided fibrous jacket 8, preferably of a fibrous material such as cotton or linen.

Figure 3:
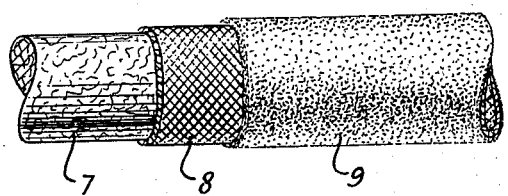
Fig. 3 is an elevation of a modified form of packing.
Figure 4:
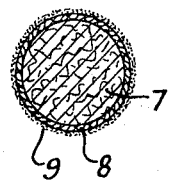
Fig. 4 is an end elevation thereof.

Figures 3 and 4 show a modification wherein the ingredients 7 are extruded, covered with a braided fibrous jacket 8 and then given a coating of grease 9.

Figure 5:
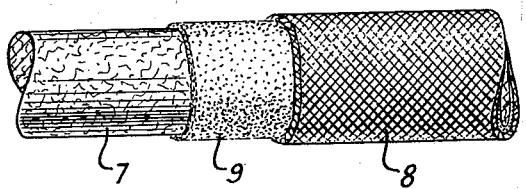
Fig. 5 is an elevation of a further modified form of the packing.

Figure 5 shows a further modification wherein the extruded ingredients 7 are given a coating of grease 9 and then covered with the fibrous jacket 8.

The grease employed for the coating on these packings and also as a plasticizer in the composition is a metallic soap base grease in which the metallic soap is sodium stearate, calcium stearate, zinc stearate or blends of these soaps. The soap content of the grease should be in excess of 25%. We have found that a grease having the following specifications (as furnished by the manufacturer) is suitable for our use:

| | |
|---|---|
| Metallic soap (sodium stearate) per cent | 37.01 |
| Oil (viscosity 210° F.) | 168.4 |
| Alkalinity (as NaOH) per cent | 0.38 |
| Powdered mica do | 7.71 |
| Water do | 0.75 |
| Drop point ° F | 466 |

It is understood from the manufacturer that no heavy mineral oil was employed in the manufacture of this grease.

Another suitable grease had the following approximate specifications:

| | |
|---|---|
| Saponified fat _____ per cent __ | 34.5 |
| Alkalinity (as NaOH) _____ do ____ | 0.6 |
| Ash _____ do ____ | 9.8 |
| Filler (mica) _____ do ____ | 5.2 |
| Unworked penetration _____ | 190 |

It is presumed that the difference in percentage between the figures given and 100% in the above two specifications is accounted for by the oil base used in these greases.

The following examples illustrate compositions suitable for the packing herein described, but it is to be understood that the invention is not restricted thereto.

EXAMPLE 1

| | Parts |
|---|---|
| Polyisobutylene, having a molecular weight of 12000 _____ | 350 |
| Granulated cork _____ | 150 |
| Grease _____ | 50 |
| Graphite _____ | 150 |

The isobutylene polymer is placed into an internal type of mixer, such as the Werner Pfleider or Banbury type, and while it is being worked, the grease is added until a uniform mixture is formed. The graphite is then added and lastly the granulated cork. The composition thus formed is extruded in the usual type of extrusion machine.

The grease which is employed consists of oil base with approximately 37% of sodium stearate and between 7 and 8% of powdered mica having the metallic soap specifications previously given.

The superiority of our packings is evident from the following tests performed on a packing according to Example 1 above and a prior art grease type packing purchased on the open market:

*Table I*

| Packing | Per cent loss in weight after 20 days at— | |
|---|---|---|
| | 250° F. | 300° F. |
| Packing of Example 1 | 4.5 | 9.5 |
| Grease type packing | 8.0 | 18.8 |

*Table II*

| Packing | Per cent rebound at 25° C. according to Schopper |
|---|---|
| Packing of Example 1 | 12 |
| Grease type packing | 7 |

It may be noted briefly that the Schopper method consists in forming a standard sample to be tested, placing it in the testing machine and determining the rebound resilience by the pendulum method. Further details of this test can be found in the literature and in standard testing procedures for rubber.

EXAMPLE 2

| | Parts |
|---|---|
| Polyisobutylene (m. w. 50,000) _____ | 100 |
| Polyisobutylene (m. w. 3,000) _____ | 250 |
| Granulated cork _____ | 150 |
| Grease _____ | 50 |
| Graphite _____ | 150 |

The procedure in this example is the same as in Example 1.

EXAMPLE 3

| | Parts |
|---|---|
| A polymer of isobutylene having a molecular weight of 10,000 _____ | 500 |
| Granulated cork _____ | 200 |
| Graphite _____ | 200 |
| Finely ground mica _____ | 10 |
| Petrolatum having a melting point of 154° F_ | 60 |

This composition is processed as in Example 1.

Further modifications of the invention will be apparent to those skilled in the art and hence we do not intend to be limited in the patent granted, except as required by the prior art and appended claims.

What we claim is:

1. A packing composition for stuffing boxes essentially comprising about 3 to 4 parts by weight of granulated cork, about 3 to 4.2 parts by weight of an inorganic foliated material, about 7 to 10 parts by weight of a polymer of isobutylene having an average molecular weight between 10,000 and 16,400, and about 1 part by weight of a plasticizer for said polymer.

2. A packing composition, as claimed in claim 1, in which said plasticizer consists of a grease.

3. A packing composition, as claimed in claim 1, in which said plasticizer consists of a metallic soap base grease.

4. A packing composition as claimed in claim 1, in which said plasticizer consists of petrolatum.

5. A packing composition, as claimed in claim 1, in which said plasticizer consists of paraffin wax.

6. A packing strip for stuffing boxes comprising a substantially non-oxidizing core of a composition containing about 3 to 4 parts by weight of granulated cork, about 3 to 4.2 parts by weight of an inorganic foliated material, about 7 to 10 parts by weight of a polymer of isobutylene having an average molecular weight between 10,000 and 16,400 and about 1 part by weight of a plasticizer for said polymer, and surrounding said composition core a jacket of fibrous material and a thin layer of grease in contact with each other, said grease layer acting as a softener for the outermost surface layer of said core.

7. A packing strip, as claimed in claim 6, in which said grease layer is disposed between said composition core and said jacket.

STANLEY LONGMAN.
CHARLES L. FARR.